United States Patent [19]

Cope

[11] Patent Number: 4,475,166
[45] Date of Patent: Oct. 2, 1984

[54] DIGITAL SIGNAL PROCESSING APPARATUS WITH IMPROVED DISPLAY

[75] Inventor: Stephen N. Cope, Cove, England

[73] Assignee: The Solartron Electronic Group Limited, Farnborough, England

[21] Appl. No.: 362,171

[22] Filed: Mar. 25, 1982

[30] Foreign Application Priority Data

Apr. 2, 1981 [GB] United Kingdom ............. 8110382

[51] Int. Cl.³ .............................................. G06F 5/00
[52] U.S. Cl. .................... 364/731; 343/5 S C
[58] Field of Search ............ 364/731, 715, 726; 343/5 S C, 5 FT; 358/140

[56] References Cited

U.S. PATENT DOCUMENTS

| | | | |
|---|---|---|---|
| 4,002,827 | 1/1977 | Nevin et al. .............. | 343/5 S C |
| 4,057,756 | 11/1977 | Ley et al. ................ | 324/77 B |
| 4,099,179 | 7/1978 | Hofstein .................. | 343/5 S C |
| 4,220,969 | 9/1980 | Nitadori ................... | 358/140 |

*Primary Examiner*—David H. Malzahn
*Attorney, Agent, or Firm*—Dale Gaudier

[57] ABSTRACT

The invention enables a logarithmic plot to be generated for values pertaining to uniformly spaced sampling points of a frequency axis, for example, such as the values provided by a discrete Fourier transform processor, while utilizing a conventional display device with a linear time base. To this end the array of input values provided by the processor is converted in a further processor to values corresponding to points uniformly spaced along a logarithmic frequency axis. If points on the logarithmic and linear axis are indexed by values x and y respectively, the y values (in general non integral) corresponding to $x-\frac{1}{2}$ and $x+\frac{1}{2}$ are calculated, the corresponding integral values of y are ascertained and the output value corresponding to x is formed as a weighted sum of the input values for these two integral y values and any intervening integral y values. The display is obtained by addressing the output values synchronously with the time base through an address circuit 17 and converting the values in a digital to analog converter 14 before application to the Y input of the display device 15.

9 Claims, 3 Drawing Figures

DIGITAL SIGNAL PROCESSING APPARATUS WITH IMPROVED DISPLAY

BACKGROUND OF INVENTION AND PRIOR ART

The present invention relates to the field of digital signal processing apparatus which operates upon a one-dimensional array of input digital values. The digital values may be real, imaginary or complex and are typically amplitudes at a series of frequencies obtained by spectrum analysis measurements, corresponding values of a derived functions such as a transfer function or coherence. A particular and commonly used array consists in the results of applying discrete Fourier transform (DFT) techniques and in such a case the values pertain to equally spaced frequency values, that is to say the frequency axis (in general terminology, the independent axis) is linear. However it is often desired to present the results on a logarithmic frequency axis in order to permit a broad frequency range to be presented on a single display, or to enhance spectral features such as slopes which are multiples of 3 dB/octave, or to assist the identification and estimation of features such as breakpoint frequencies, noise levels, etc.

In order to display the array of values they are applied by way of a digital-to-analog converter (DAC) to a display device synchronously with control of the display device to sweep along the independent axis. The display device may be a cathode ray tube (CRT) or other device providing an ephemeral display or it may be some form of a recorder or plotter which produces a permanent record, whether of graph or histogram form.

In the past, a logarithmic independent axis has been obtained by providing a logarithmic sweep on this axis, e.g. in a CRT or XY plotter. This has at least two disadvantages. In the first place it precludes the use of simpler, less expensive display devices with linear sweep, e.g. a CRT with electromagnetic deflection. In the second place, if the independent axis has a large span, e.g. as with a broad-band spectrum analysis, the values at the low end of the independent axis become very widely spaced.

The main object of the invention is to overcome the first disadvantage, while a development of the invention enables the second disadvantage also to be overcome.

BRIEF DESCRIPTION OF INVENTION

The invention provides a novel combination of apparatus with a processor performing specific operations on the data provided by a first processor such as a discrete Fourier transform processor. The apparatus comprises a display device with a linear time base and a second processor in which the array of input values provided by the first processor is converted to values corresponding to points uniformly spaced along a logarithmic frequency axis. If points on the logarithmic and linear axis are indexed by values x and y respectively, the y values (in general non integral) corresponding to $x-\frac{1}{2}$ and $x+\frac{1}{2}$ are calculated, the corresponding integral values of y are ascertained and the output value corresponding to x is formed as a weighted sum of the input values for these two integral y values and any intervening integral y values. The display is obtained by addressing the output values synchronously with the time base through an address circuit and converting the values in a digital to analog converter before application to the y input of the display device.

It is therefore an object of the present invention to provide digital signal processing and display apparatus which generates a logarithmic plot but which has a display device with a linear plot.

It is a further object to provide such apparatus for displaying uniformly spaced values even with a large span.

BRIEF DESCRIPTION OF DRAWINGS

The invention will be described in more detail by way of example, with reference to the accompanying drawings, in which.

DESCRIPTION OF PREFERRED EMBODIMENT

The principle underlying the invention will first of all be explained with reference to FIG. 1 which plots the linear frequency index y against the logarithmic frequency index x. In view of the selection of the logarithmic frequency index as abscissa, the curve relating the two indices has an exponential form, the exponent being D. The span of x from 0 to $N_2$ corresponds to the span of y from $(N_1/D)$ to $N_1$ and D is chosen in accordance with the desired span for the linear frequency index. Typical spans are a decade and an octave for which D is 10 and 2 respectively.

Although $N_2$ and $N_1$ do not in general have to be equal it will commonly be convenient to make them equal when the conversion is being effected over a single decade or octave. As will be explained more fully below, a value of $N_2$ less than $N_1$ may be appropriate when conversion is effected over a plurality of decades or octaves.

Figure 1:
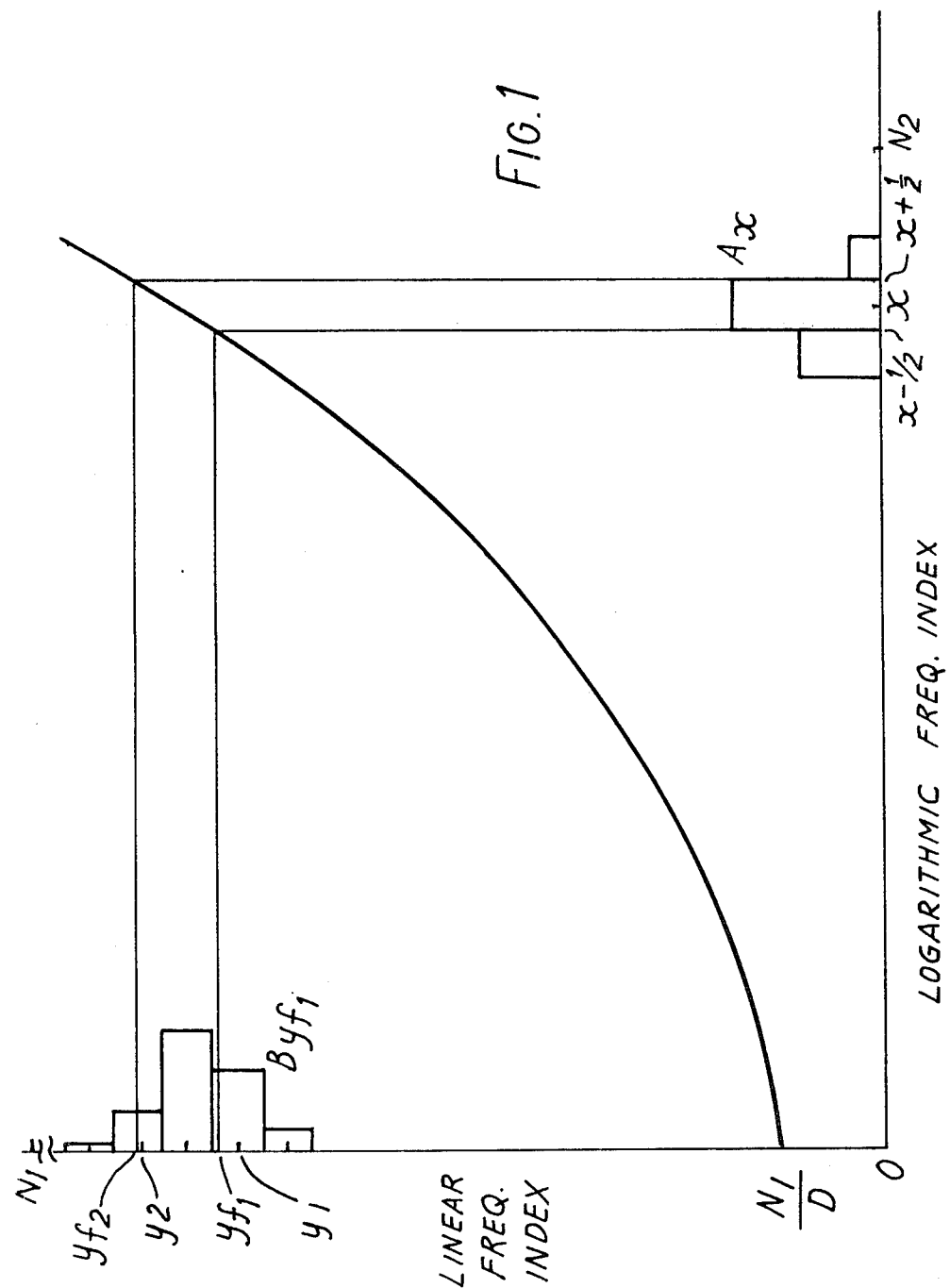
FIG. 1 is a diagram used in explaining the invention.

FIG. 1 shows, by way of example, a small group of A values in the vicinity of one x value, and a corresponding group of B values. The values are shown in histogram form although it will be appreciated that, when either set of values is displayed, whether it appears as a histogram or a smooth curve will depend upon the nature of the display device. FIG. 1 is labelled for the case of values corresponding to a plurality of spaced frequencies and the linear frequency index corresponds to a frequency range from zero to $N_1 \Delta f$. The input data points $B_y$ may have been produced for example by DFT analysis of a signal waveform of basic duration $T = 1/\Delta f$. The data value $B_y$ is the value of the measurement between the frequencies $(y-\frac{1}{2})\Delta f$ and $(y+\frac{1}{2})\Delta f$. On conversion of the top fraction $(1-(1/D))$ of the array into the array of $N_2+1$ data points with a logarithmic frequency index, the frequency range covered will extend from $(N_1/D)\Delta f$ up to $N_1 \Delta f$.

The output data point with logarithmic frequency index x is the value of the measurement between the frequency $f_1$ and $f_2$ where $$x - \tfrac{1}{2} = N_2 \cdot \log_D\left(f_1 \cdot \frac{D}{N_1 \Delta f}\right)$$

$$x + \tfrac{1}{2} = N_2 \cdot \log_D\left(f_2 \cdot \frac{D}{N_1 \Delta f}\right)$$

-continued $$f_1 = \frac{N_1 \Delta f}{D} \cdot D^{(x-\frac{1}{2})/N_2}$$

$$f_2 = \frac{N_1 \Delta f}{D} \cdot D^{(x+\frac{1}{2})/N_2}$$

$$= f_1 \cdot D^{1/N_2}$$

These frequencies do not in general correspond to exact integer indices within the linear frequency indexed array of data, and it is necessary to interpolate and combine data in order to perform the conversion to logarithmic frequency indexing. The fractional linear frequency indices $y_{f1}$ and $y_{f2}$ corresponding to the edge of the frequency band represented by the data with logarithmic frequency index x are $$y_{f1} = \frac{f_1}{\Delta f} = \frac{N_1}{D} \cdot D^{(x-\frac{1}{2})/N_2}$$

$$y_{f2} = \frac{f_2}{\Delta f} = \frac{N_1}{D} \cdot D^{(x+\frac{1}{2})/N_2}$$

$$= y_{f1} \cdot D^{1/N_2}$$

The data required for interpolation and combining are given by the integer linear frequency indices $y_1$ and $y_2$ and these data are scaled by weighting coefficients.

$$y_1 = INT(y_{f1} + \tfrac{1}{2})$$

$$y_2 = INT(y_{f2} + \tfrac{1}{2})$$

If $y_1$ and $y_2$ are equal, then the required data point has index $y_1$ and is weighted by the fraction $$(y_{f2} + \tfrac{1}{2} - y_{f1} - \tfrac{1}{2}) = (y_{f2} - y_{f1})$$

i.e.

$$A_x = B_{y_1}(y_{f2} - y_{f1})$$

If $y_2$ is greater than $y_1$, then the two or more data points with indices $y_1, \ldots, y_2$ are required, weighted as follows:
point $y_1$ weighted by $(y_1 + 1 - y_{f1} - \tfrac{1}{2}) = (y_1 + \tfrac{1}{2} - y_{f1})$
any points $y_1 + 1$ to $y_2 - 1$ (possibly none) weighted by 1
point $y_2$ weighted by $(y_{f2} + \tfrac{1}{2} - y_2)$ i.e. $A_x = B_{y_1}(y_1 + \tfrac{1}{2} - y_{f1}) + B_{y_2}(y_{f2} + \tfrac{1}{2} - y_2) + \sum_i B_{y_i}$ where $y_i$ takes all integral values (if any) $y_2 > y_i > y_1$.

Figure 2:
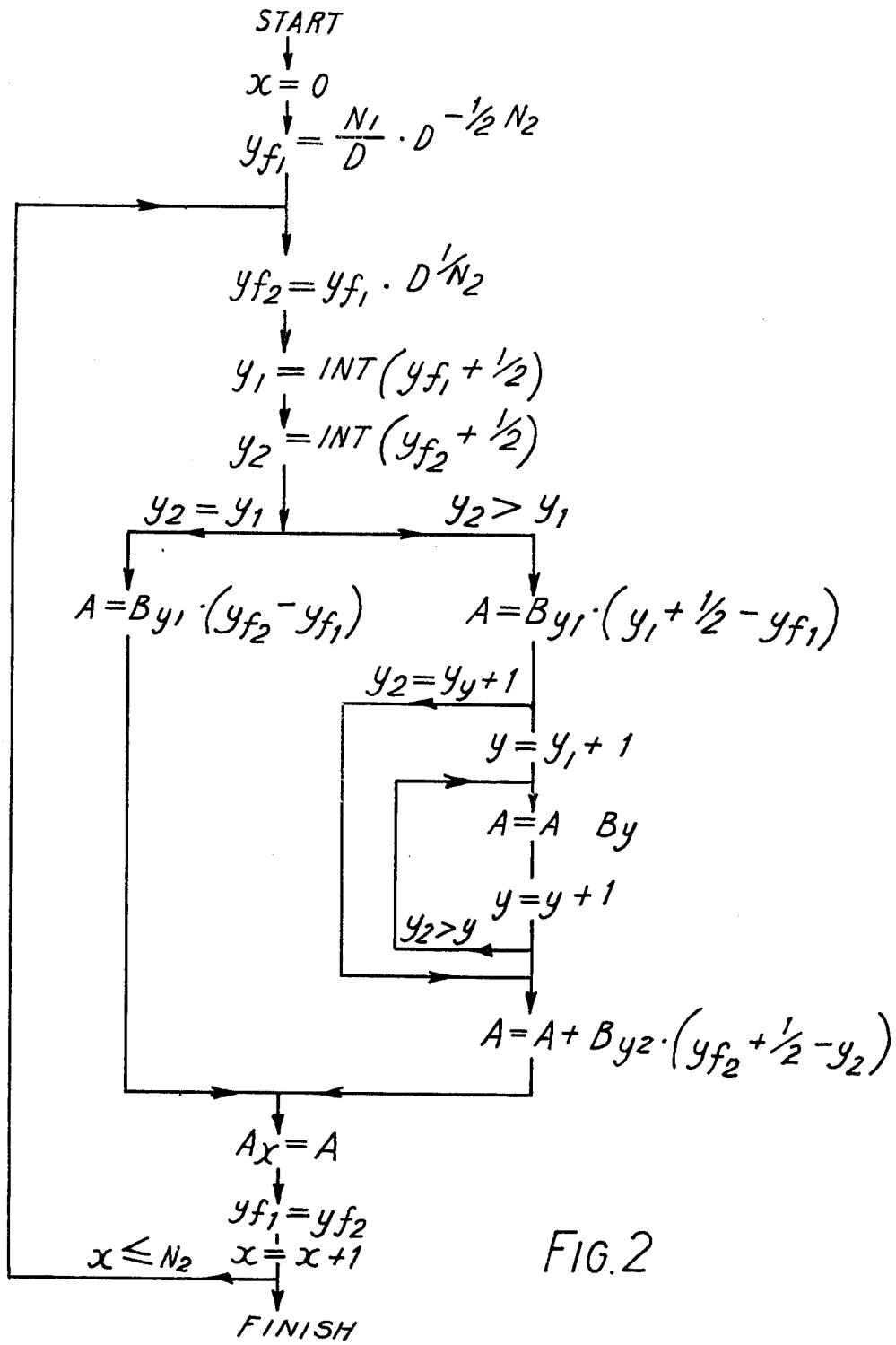
FIG. 2 is a flow chart showing operations performed in implementing the invention.

Starting with an initial value of $y_{f1} = (N_1/D) \cdot D^{-\frac{1}{2}N_2}$ when $x = 0$, $y_{f2}$ is obtained by multiplying $y_{f1}$ by $D^{1/N_2}$. These values of $y_{f1}$ and $y_{f2}$ are used to address and weight the data required to produce the converted data for point, $x = 0$. Substituting $y_{f2}$ back as the new value of $y_{f1}$, and repeating this process generates successive converted data points, $x = 1, 2, \ldots N_2$. This process is detailed in the flowchart shown in FIG. 2.

Since each data point in the top fraction $(1 - (1/D))$ of the linear indexed array is divided into one or more parts, all of which are used to construct the data points within the logarithmic indexed array, the area under that portion of the curve is conserved. In the case where the data represent a power measurement power is thus conserved, and it is still possible to calculate parameters such as the power within a given frequency band.

The conversion process described expands and interpolates data at the lower end of the converted frequency band, and compresses and combines data at the upper end. Hence data such as the power spectrum of white noise, which has a flat power distribution when presented on a linear frequency axis, is now converted to a distribution with a 3 dB/octave rising slope when presented on the new logarithmic frequency axis.

If the process which is providing the linear indexed measurement data is capable of providing higher resolution measurements of the lower fraction 1/D of the frequency range of the linear frequency indexed array (e.g. by measuring for D times as long) then the process described may be applied successively to lower decades (octaves etc) and by appending the resulting logarithmic frequency arrays, a single array may be constructed covering a wide frequency range of several decades (octaves etc.). This application of the process is useful for the analysis and display of broad bandwidth signal, such as occur in acoustic measurements, etc.

In order that the output arrays shall be correctly appended to form the final output array, certain precautions have to be taken, as explained in Chapter 7 of Digital Processing of Signals, Gold and Rader, McGraw Hill, 1969, for example. Preferably use is made in this respect of the invention described in the specification of our U.S. Pat. No. 4,057,756.

The exponentiation performed within the process of repeatedly multiplying by the value $D^{1/N_2}$ which is close to 1, must be performed with sufficient arithmetic precision to avoid numerical inaccuracies inherent in this form of repeated multiplication, or else the exponential term can be derived by any other appropriate algorithm to hand. The precision sufficient to avoid numerical problems depends greatly on the values of $N_1$, $N_2$ and D.

Figure 3:
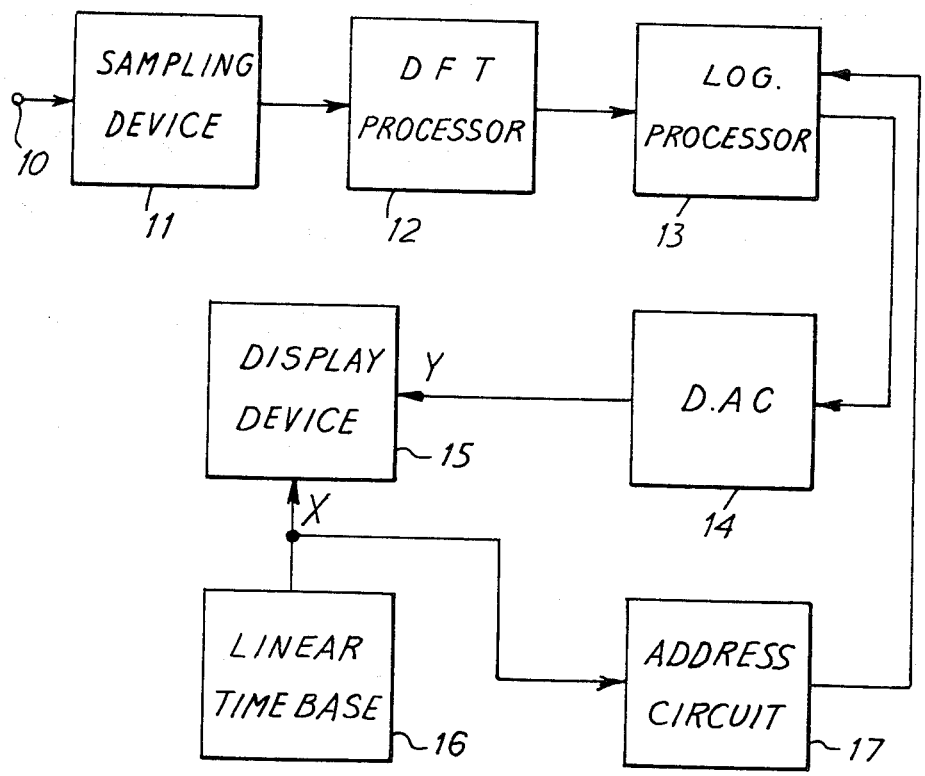
FIG. 3 is a block diagram of apparatus embodying the invention.

FIG. 3 is a block diagram of one apparatus embodying the invention. As one practical example the embodiment illustrated is intended to display the frequency spectrum of an input signal on a logarithmic frequency axis. The input signal is applied to an input terminal 10 and sampled by a sampling device 11 which provides an array of data points to a DFT processor 12. This may either be a dedicated processor or a suitably programmed general purpose processor and it provides in manner well known per se an array of data points $B_0$ to $B_{N_1}$ representing spectal amplitudes over the frequency range up to $N_1 \Delta f$. These data points are further processed by a logarithmic processor 13 which operates in accordance with the flowchart of FIG. 2. This may again be a dedicated processor or a suitably programmed general purpose processor and the processors 12 and 13 may consist of the same hardware performing the DFT and logarithmic processing sequentially.

The logarithmic processor 13 generates the array of output values $A_0$ to $A_{N_2}$ and these values are applied by way of a DAC 14 to the input of some kind of two coordinate display device 15. The input of this device is driven by a linear time base 16 which also provides a signal to an address circuit 17 which causes the A values to be read out from the logarithmic processor 13 synchronously with the linear time base.

Performing the logarithmic frequency transformation on the spectral data, by means of the processor 13, rather than within the display device 15, 16 permits the use of a simpler display device without the need for a logarithmic time base sweep. For example, a raster scan CRT such as a conventional TV monitor, a graphics terminal or a standard graph plotter can be used. The logarithmic indexed spectral data can also be stored, transmitted or further processed, still in its logarithmic form.

I claim:

1. Digital signal processing and display apparatus which operates upon an array of $N_1+1$ input digital values $B_y$ with a linear independent axis index y taking the integral values from 0 to $N_1$ and produces an array of $N_2+1$ output digital values $A_x$ with a logarithmic independent axis index x taking the integral values from 0 to $N_2$ said array of output values $A_x$ corresponding to those input values $B_y$ for which y lies in the range $N_1/D$ to $N_1$, where D is an integer and the base of the logarithms for the logarithmic independent axis, said apparatus comprising signal processing means arranged to form for each value of x two values $y_1$ and $y_2$ where $y_1 = INT(y_{f1} + \frac{1}{2})$ $y_2 = INT(y_{f2} + \frac{1}{2})$ $y_{f1} = N_1/D \cdot D^{(x-\frac{1}{2})/N_2}$ $y_{f2} = y_{f1} \cdot D^{1/N_2}$ and where INT represents "the integral part of",
means arranged to form a corresponding output digital value $A_x$ as a weighted combination of the one or more values $B_y$ comprising $B_{y1}$ to $B_{y2}$ inclusive,
a two-coordinate display device operative to display input data and having time base means arranged to display input data with a linear spacing, and
means for feeding the output values $A_x$ to the display device as the input data therefor, such that said output values $A_x$ are displayed in order as determined by said index x.

2. Apparatus according to claim 1, comprising a digital to analog converter between the signal processing means and the display device.

3. Apparatus according to claim 1, wherein the weighting is such that, when $y_2 = y_1$, $A_x = B_{y1}(y_{f2} - y_{f1})$ and when $y_2 > y_1$ $A_x = B_{y1}(y_1 + \frac{1}{2} - y_{f1})$
$+ B_{y2}(y_{f2} + \frac{1}{2} - y_2)$
$+ \sum_i B_{yi}$ where $y_i$ takes all integral values (if any) $y_2 > y_i > y_1$.

4. Apparatus according to claim 1, wherein the apparatus is arranged to perform successive operations on a plurality of input arrays to form a plurality of output arrays and further comprising means for holding said values of $N_2$ and D constant during all operations and for selecting a new value of $N_1$ for each operation such that the index for each input array, other than the first, takes integral values in the range 0 to $N_T/D$, where $N_T$ represents the value of $N_1$, selected for the previous operation, and means to append the output arrays to form a final output array.

5. Digital signal processing apparatus operative upon an array of $N_1+1$ input digital values $B_y$ with a linear independent axis index y taking the integral values from 0 to $N_1$ to produce an array of $N_2+1$ output digital values $A_x$ with a logarithmic independent axis index x taking the integral values from 0 to $N_2$ said array of output values $A_x$ corresponding to those input values $B_y$ for which y lies in the range $N_1/D$ to D, where D is an integer and the base of the logarithms for the logarithmic independent axis, comprising:

signal processing means arranged to form for each value of x two values $y_1$ and $y_2$ where $y_1 = INT(y_{f1} + \frac{1}{2})$ $y_2 = INT(y_{f2} + \frac{1}{2})$ $y_{f1} = N_1/D \cdot D^{(x-\frac{1}{2})/N_2}$ $y_{f2} = y_{f1} \cdot D^{1/N_2}$ and where INT represents "the integral part of", and,
means arranged to form a corresponding output digital value $A_x$ as a weighted combination of the one or more values $B_y$ comprising $B_{y1}$ to $B_{y2}$ inclusive.

6. Apparatus according to claim 5, wherein the weighting is such that, when $y_2 = y_1$, $A_x = B_{y1}(y_{f2} - y_{f1})$ and when $y_2 > y_1$ $A_x = B_{y1}(y_1 + \frac{1}{2} - y_{f1})$
$+ B_{y2}(y_{f2} + \frac{1}{2} - y_2)$
$+ \sum_i B_{yi}$ where $y_i$ takes all integral values (if any) $y_2 > y_i > y_1$.

7. Apparatus according to claim 5, wherein the apparatus is arranged to perform successive operations on a plurality of input arrays to form a plurality of output arrays and further comprising means for holding said values of $N_2$ and D constant during all operations and for selecting a new value of $N_1$ for each operation such that the index for each input array, other than the first, takes integral values in the range 0 to $N_T/D$, where $N_T$ represents the value of $N_1$, selected for the previous operation, and means to append the output arrays to form a final output array.

8. Apparatus according to claim 5, further comprising a two-coordinate display device operative to display input data and having time base means arranged to display input data with a linear spacing, and means for feeding the output values $A_x$ to the display device as the input data therefor, such that said output values $A_x$ are displayed in order as determined by said index x.

9. Apparatus according to claim 8, comprising a digital to analog converter between the signal processing means and the display device.

* * * * *